(12) United States Patent
Fukuda

(10) Patent No.: US 11,184,521 B2
(45) Date of Patent: Nov. 23, 2021

(54) FOCUS DETECTION APPARATUS, FOCUS DETECTION METHOD, AND STORAGE MEDIUM

(71) Applicant: CANON KABUSHIKI KAISHA, Tokyo (JP)

(72) Inventor: Koichi Fukuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/539,014

(22) Filed: Aug. 13, 2019

(65) Prior Publication Data

US 2019/0364220 A1 Nov. 28, 2019

Related U.S. Application Data

(63) Continuation of application No. PCT/JP2018/003792, filed on Feb. 5, 2018.

(30) Foreign Application Priority Data

Feb. 14, 2017 (JP) .............................. JP2017-024833

(51) Int. Cl.
*H04N 5/232* (2006.01)
*G02B 7/34* (2021.01)

(52) U.S. Cl.
CPC ......... *H04N 5/232122* (2018.08); *G02B 7/34* (2013.01)

(58) Field of Classification Search
None
See application file for complete search history.

(56) References Cited

U.S. PATENT DOCUMENTS 4,904,854 A * 2/1990 Ishida .................... G02B 7/346
250/201.2
6,829,008 B1 12/2004 Kondo et al.
(Continued)

FOREIGN PATENT DOCUMENTS

CN 1885145 A 12/2006
CN 104949659 A 9/2015
(Continued)

OTHER PUBLICATIONS

PCT/IB/338 (PCT Notification of Transmittal of Translation of the International Preliminary Report on Patentability).
(Continued)

*Primary Examiner* — Mark T Monk
(74) *Attorney, Agent, or Firm* — Cowan, Liebowitz & Latman P.C.

(57) ABSTRACT

A focus detection apparatus configured to perform a focus detection using a pixel signal obtained by photoelectrically converting light passing through different pupil areas in an imaging optical system includes an acquirer configured to acquire the pixel signal, a signal generator configured to generate a plurality of focus detection signals corresponding to the different pupil areas using the pixel signal, and a focus detector configured to calculate a detected defocus amount based on the plurality of focus detection signals, and to calculate a corrected defocus amount by correcting the detected defocus amount based on a phase transfer function corresponding to the different pupil areas.

13 Claims, 11 Drawing Sheets

(56) References Cited

U.S. PATENT DOCUMENTS

| | | | |
|---|---|---|---|
| 2011/0052174 A1* | 3/2011 | Kojima | G03B 7/00 396/213 |
| 2013/0016274 A1* | 1/2013 | Matsuo | H04N 9/04557 348/345 |
| 2014/0028869 A1 | 1/2014 | Hatakeyama | |
| 2014/0139725 A1 | 5/2014 | Nagano | |
| 2015/0281559 A1 | 10/2015 | Ikemoto | |
| 2015/0316833 A1 | 11/2015 | Watanabe et al. | |
| 2017/0034426 A1 | 2/2017 | Fukuda | |

FOREIGN PATENT DOCUMENTS

| | | |
|---|---|---|
| JP | 2000-156823 A | 6/2000 |
| JP | 2011-053378 A | 3/2011 |
| JP | 2013-062587 A | 4/2013 |
| JP | 2015-121778 A | 7/2015 |
| JP | 2015-197511 A | 11/2015 |
| WO | 2016/0079965 A1 | 5/2016 |

OTHER PUBLICATIONS

PCT/IB/373 (PCT International Preliminary Report on Patentability).
PCT/ISA/237 (PCT Written Opinion of the International Searching Authority).
International Search Report of the corresponding International Application, PCT/JP2018/003792 dated May 15, 2018, which is enclosed.
Feb. 9, 2021 Chinese Office Action, which is enclosed with an English Translation, that issued in Chinese Patent Application No. 201880011931.8.
European Search Report dated Nov. 3, 2020, which is enclosed, that issued in the corresponding European Patent Application No. 18754478.8.

* cited by examiner

IN-FOCUS
POSITION

SECTIONAL VIEW
PARALLEL TO OPTICAL
AXIS

SECTIONAL VIEW
PERPENDICULAR TO
OPTICAL AXIS

PUPIL PROJECTION $h_{A,B}(x)$

PUPIL COORDINATE x [mm]

FOCUS DETECTION APPARATUS, FOCUS DETECTION METHOD, AND STORAGE MEDIUM

CROSS-REFERENCE TO RELATED APPLICATIONS

This application is a Continuation of International Patent Application No. PCT/JP2018/003792, filed on Feb. 5, 2018, which claims the benefit of Japanese Patent Application No. 2017-024833, filed on Feb. 14, 2017, both of which are hereby incorporated by reference herein in their entirety.

BACKGROUND OF THE INVENTION

Field of the Invention

The present invention relates to a focus detection apparatus, a focus detection method, and a focus detection program.

Description of the Related Art

Conventionally, there is known an imaging apparatus that performs a focus detection of an imaging lens by a phase difference detection method using a two-dimensional image sensor in which a micro lens is formed on each pixel. Japanese Patent Laid-Open No. ("JP") 2000-156823 discloses an imaging apparatus in which a pair of focus detection pixels are disposed on part of a two-dimensional image sensor including a plurality of pixels. The pair of focus detection pixels are configured to receive light from different areas on an exit pupil of an imaging lens by a light shielding layer having an opening, and provide a pupil division. An imaging signal is acquired by imaging pixels that are disposed on most part of the two-dimensional image sensor, and an image shift amount is obtained from focus detection signals from the partially disposed focus detection pixels to perform the focus detection.

However, in the imaging apparatus disclosed in Patent Document 1, each partial pupil area divided by a micro lens has a different shape, and thus a shape difference occurs between the focus detection signals. As a result, an effective baseline length for each spatial frequency band changes, and the focus detection accuracy lowers.

SUMMARY OF THE INVENTION

The present invention provides a focus detection apparatus, a focus detection method, and a focus detection program, each of which can correct a focus detection error caused by a shape difference between the focus detection signals, and perform a focus detection with high accuracy.

A focus detection apparatus according to one aspect of the present invention configured to perform a focus detection using a pixel signal obtained by photoelectrically converting light passing through different pupil areas in an imaging optical system includes an acquirer configured to acquire the pixel signal, a signal generator configured to generate a plurality of focus detection signals corresponding to the different pupil areas using the pixel signal, and a focus detector configured to calculate a detected defocus amount based on the plurality of focus detection signals, and to calculate a corrected defocus amount by correcting the detected defocus amount based on a phase transfer function corresponding to the different pupil areas.

A focus detection method according to another aspect of the present invention configured to perform a focus detection using a pixel signal obtained by photoelectrically converting light passing through different pupil areas in an imaging optical system includes an acquisition step configured to acquire the pixel signal, a signal generation step configured to generate a plurality of focus detection signals corresponding to the different pupil areas using the pixel signal, and a focus detection step configured to calculate a detected defocus amount based on the plurality of focus detection signals, and to calculate a corrected defocus amount by correcting the detected defocus amount based on a phase transfer function corresponding to the different pupil areas.

Further features of the present invention will become apparent from the following description of exemplary embodiments with reference to the attached drawings.

DESCRIPTION OF THE EMBODIMENTS

Figure 1:
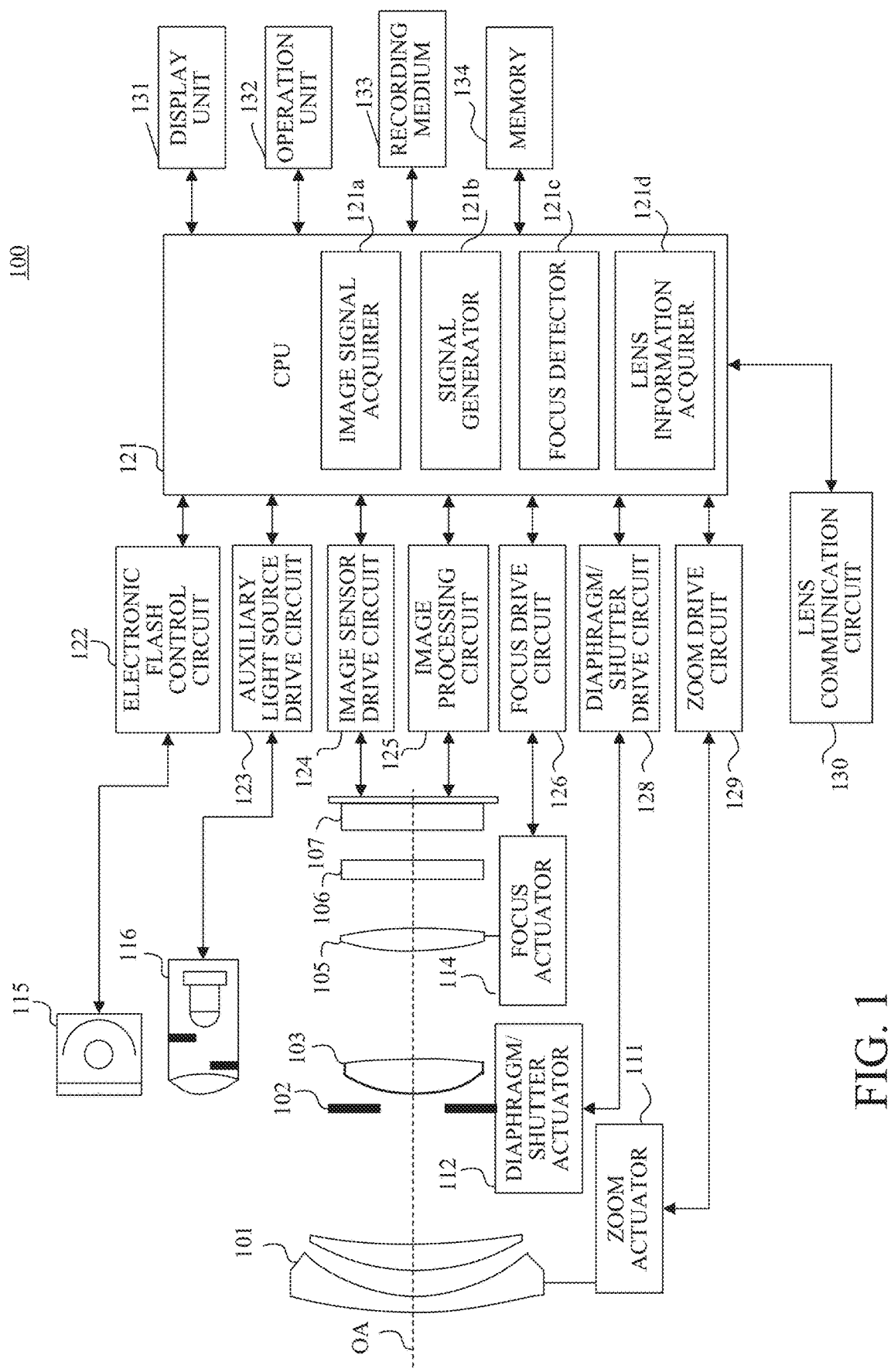
FIG. 1 is a block diagram showing a configuration of an imaging apparatus having a focus detection apparatus according to a first embodiment.

Referring now to the accompanying drawings, a description will be given of embodiments according to the present invention. Corresponding elements in respective figures will be designated by the same reference numerals, and a description thereof will be omitted.

While this embodiment describes that the present invention is applied to an imaging apparatus such as a digital camera, the present invention is broadly applicable to an apparatus different from an imaging apparatus such as a focus detection apparatus, an information processing apparatus, and an electronic apparatus.

First Embodiment

[General Configuration]

FIG. 1 is a block diagram showing the configuration of an imaging apparatus 100 having a focus detection apparatus according to this embodiment. The imaging apparatus 100 is a digital camera system including a camera body and an interchangeable lens (imaging optical system or image capturing optical system) that is detachably attached to the camera body. However, the present invention is not limited to this embodiment, and is also applicable to an imaging apparatus in which a camera body and a lens are integrated with each other.

The imaging optical system (image capturing optical system) generates an object image (optical image) of an object. A first lens unit 101 is disposed on the frontmost side (object side) among the plurality of lens units constituting the imaging optical system, and held by the lens barrel so as to move forward and backward along the optical axis OA. A diaphragm/shutter (diaphragm) 102 adjusts a light amount in the imaging by adjusting an aperture diameter, and serves as an exposure time adjusting shutter in still image capturing. A second lens unit 103 moves forward and backward along the optical axis OA integrally with the aperture/shutter 102, and has a zoom function that performs a zooming operation in association with the moving forward and backward operation of the first lens unit 101. A third lens unit 105 is a focus lens unit that performs focusing (focus operation) by moving forward and backward along the optical axis OA. An optical low-pass filter 106 is an optical element that reduces a false color and moiré in a captured image.

An image sensor 107 includes, for example, a CMOS sensor or a CCD sensor, and a peripheral circuit thereof, and performs a photoelectric conversion of the object image. The image sensor 107 uses, for example, a two-dimensional single-plate color sensor in which on-chip primary color mosaic filters are formed in Bayer array on a light receiving pixel having m pixels in the horizontal direction and n pixels in the vertical direction.

In a zooming operation, a zoom actuator 111 moves (drives) a cam cylinder (not shown) to move the first lens unit 101 and the second lens unit 103 along the optical axis OA. An diaphragm/shutter actuator 112 adjusts the aperture diameter of the aperture/shutter 102 in adjusting the light amount (imaging light amount). A focus actuator 114 moves the third lens unit 105 along the optical axis OA during focusing.

An electronic flash 115 is an illumination apparatus used to illuminate an object. The electronic flash 115 uses a flash illumination apparatus with a xenon tube or an illumination apparatus with a continuously emitting LED (Light Emitting Diode). An AF auxiliary light source 116 projects an image of a mask having a predetermined aperture pattern onto an object via a projection lens. This configuration can improve the focus detecting capability for a dark object or a low-contrast object.

A CPU 121 is a control apparatus (controller) that governs a variety of controls of the imaging apparatus 100. The CPU 121 includes a calculator, a ROM, a RAM, an A/D converter, a D/A converter, a communication interface circuit, and the like. The CPU 121 reads out and executes a predetermined program stored in the ROM to drive a variety of circuits of the imaging apparatus 100 and controls a series of operations such as a focus detection (AF), imaging, image processing, and recording.

The CPU 121 further includes a pixel signal acquirer (acquirer) 121a, a signal generator 121b, a focus detector 121c, and a lens information acquirer 121d.

The electronic flash control circuit 122 performs a lighting control of the electronic flash 115 in synchronization with the imaging operation. The auxiliary light source drive circuit 123 performs a lighting control of the AF auxiliary light source 116 in synchronization with the focus detection operation. The image sensor drive circuit 124 controls the imaging operation of the image sensor 107, A/D-converts the acquired image signal, and transmits it to the CPU 121. The image processing circuit (image processing apparatus) 125 performs processing such as a gamma conversion, a color interpolation, or a JPEG (Joint Photographic Experts Group) compression, for image data output from the image sensor 107.

A focus drive circuit 126 drives the focus actuator 114 based on the focus detection result, and performs focusing by moving the third lens unit 105 along the optical axis OA. A diaphragm/shutter drive circuit 128 drives the diaphragm/shutter actuator 112 to control the aperture diameter of the diaphragm/shutter 102 and also controls the exposure time in still image capturing. A zoom drive circuit 129 drives the zoom actuator 111 according to the zoom operation of the photographer to move the first lens unit 101 and the second lens unit 103 along the optical axis OA for the magnification variation operation.

A lens communication circuit 130 communicates with the interchangeable lens attached to the camera body to acquire the lens information of the interchangeable lens. The acquired lens information is output to the lens information acquirer 121d in the CPU 121.

The display unit 131 includes, for example, an LCD (Liquid Crystal Display). The display unit 131 displays information on an imaging mode of the imaging apparatus 100, a preview image prior to imaging, a confirmation image after the imaging, or an in-focus state display image in the focus detection. The operation unit 132 includes a power switch, a release (imaging trigger) switch, a zoom operation switch, an imaging mode selection switch, and the like. The release switch has a two-step switch of a half-pressed state (SW1 is on) and a fully pressed state (SW2 is on). A recording medium 133 is, for example, a flash memory that is removable from the imaging apparatus 100, and records a captured image (image data). A memory 134 stores a captured image and the like in a predetermined format.

[Image Sensor]

Figure 2:
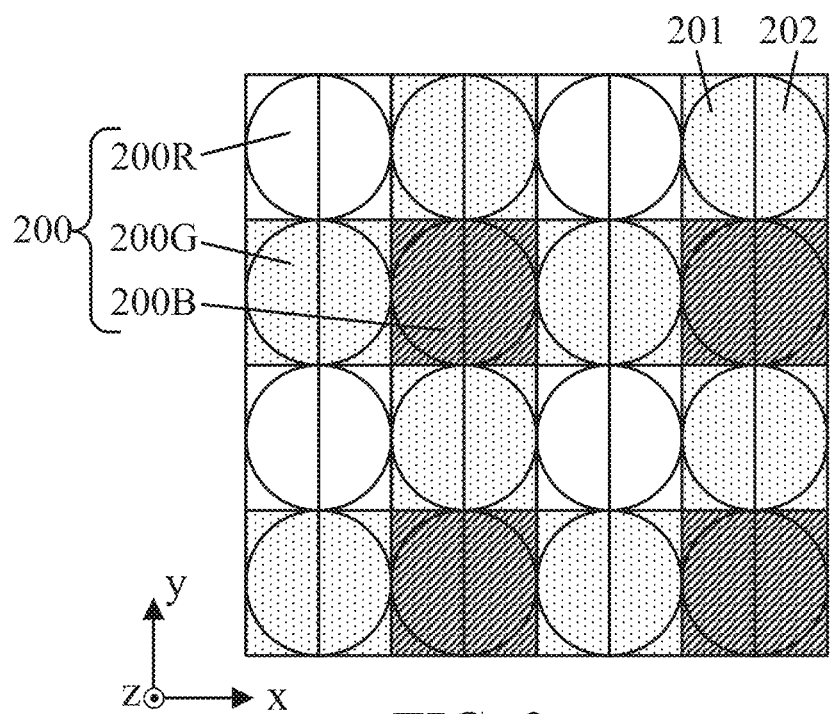
FIG. 2 is a diagram showing a pixel array according to the first embodiment.
Figures 3A, 3B:
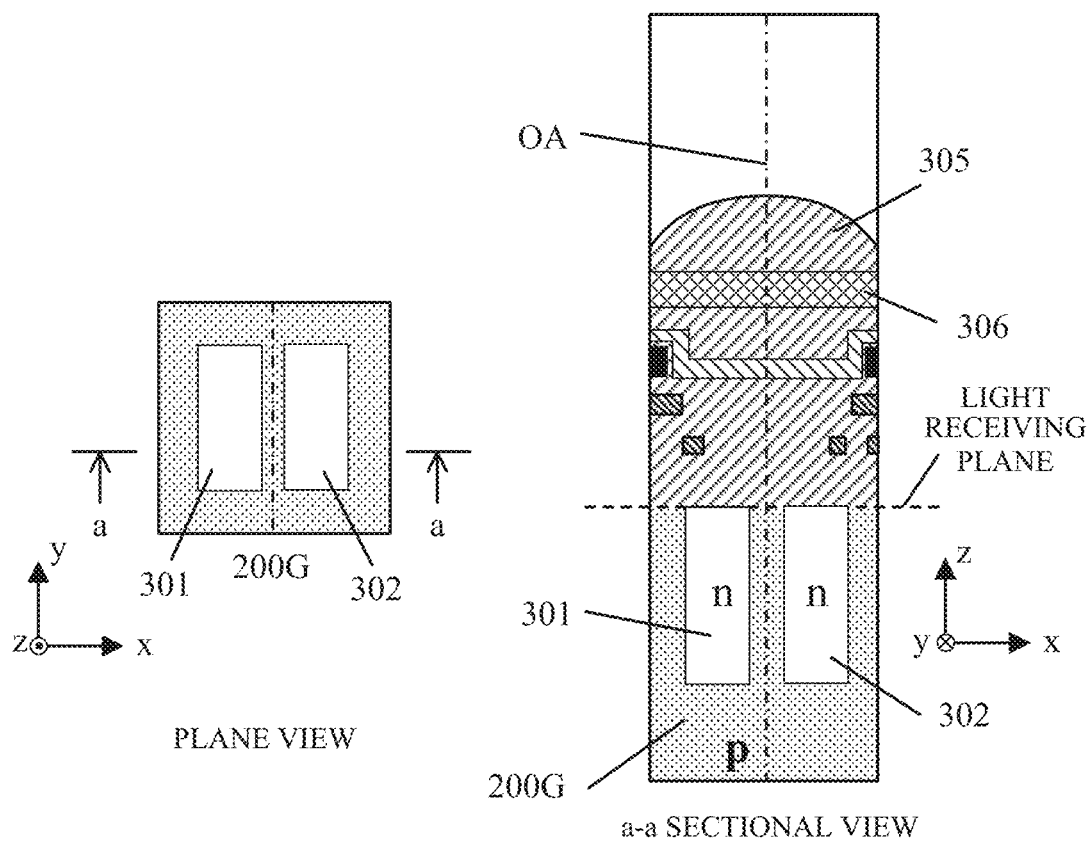
FIGS. 3A and 3B show a pixel structure according to the first embodiment.

Referring now to FIGS. 2 and 3, a description will be given of a pixel array and a pixel structure of the image sensor (two-dimensional CMOS sensor) 107 according to this embodiment. FIG. 2 is a diagram showing a pixel (imaging pixel) array of the image sensor 107. FIGS. 3A and 3B illustrates the pixel structure of the image sensor 107. FIG. 3A is a plan view of a pixel 200G of the image sensor 107 viewed from the +z direction), and FIG. 3B is a sectional view taken along a line a-a in FIG. 3A (viewed from the −y direction).

FIG. 2 illustrates the pixel array of the image sensor 107 in a range of 4 columns×4 rows. In this embodiment, each pixel (pixels 200R, 200G, and 200B) has two subpixels 201 and 202. Thus, FIG. 2 illustrates a subpixel array in the range of 8 columns×4 rows.

As illustrated in FIG. 2, in the pixel unit 200 of 2 columns×2 rows, pixels 200R, 200G, and 200B are arranged in a Bayer array. In other words, the pixel unit 200 includes a pixel 200R having a spectral sensitivity of R (red) located at the upper left, the pixels 200G having a spectral sensitivity of G (green) located at the upper right and lower left, and the pixel 200B having a spectral sensitivity of B (blue) located at the lower right. The pixels 200R, 200G, and 200B have subpixels (focus detection pixels) 201 and 202 arranged in 2 columns×1 row. The subpixel (first subpixel) 201 is a pixel that receives a light flux that has passed through the first pupil area in the imaging optical system. The subpixel (second subpixel) 202 is a pixel that receives a light flux that has passed through the second pupil area of the imaging optical system.

As illustrated in FIG. 2, the image sensor 107 has a large number of 4 columns×4 rows of pixels (8 columns×4 rows of subpixels) on the surface, and outputs an imaging signal (subpixel signal). The image sensor 107 according to this embodiment has a pixel cycle P of 6 μm, and a pixel member N is 6,000 rows×4000 rows=24 million pixels. Further, the image sensor 107 has a period. $P_{SUB}$ of 3 μm in the column direction of the subpixels, and a subpixel number $N_{SUB}$ of 12000 columns×4000 rows=48 million pixels. The number of pixels is not limited to this example, and 8000 or more columns may be horizontally provided to realize the 8K motion image. Further, the pixel having the subpixel and the pixel having no subpixel (non-divided pixel) may be mixed in the pixel array.

As illustrated in FIG. 3B, the pixel 200G according to this embodiment has a micro lens 305 for condensing incident light on the light receiving plane side of the pixel. A plurality of micro lenses 305 are two-dimensionally arrayed, and separated from the light receiving plane by a predetermined distance in the z-axis direction (direction of the optical axis OA). Further, the pixel 200G has photoelectric converters 301 and 302 of a division number $N_{LF}$=Nx×Ny (division number 2) divided by Nx (two divisions) in the x direction and divided by Ny (one division) in the y direction. The photoelectric converters 301 and 302 correspond to the subpixels 201 and 202, respectively.

Each of the photoelectric converters 301 and 302 is configured as a photodiode having a pin structure in which an intrinsic layer is sandwiched between a p-type layer and an n-type layer. If necessary, the intrinsic layer may be omitted and configured as a pn junction photodiode. The pixel 200G (each pixel) includes a color filter 306 between the micro lens 305 and the photoelectric converters 301 and 302. If necessary, a spectral transmittance of the color filter 306 can be changed for each pixel or each photoelectric converter, or the color filter may be omitted. Where the color filter is omitted, the spectral transmittance of white having a high transmittance in the visible light region may be provided, or the spectral transmittance may be provided in the infrared light region.

The light incident on the pixel 200G is collected by the micro lens 305, separated by the color filter 306, and then received by the photoelectric converters 301 and 302. In the photoelectric converters 301 and 302, pairs of electrons and holes are generated according to the received light amount, and after they are separated by the depletion layer, the electrons of a negative charge are stored in the n-type layer. On the other hand, holes are discharged to the outside of the image sensor 107 through a p-type layer connected to a constant voltage source (not shown). The electrons accumulated in the n-type layers of the photoelectric converters 301 and 302 are transferred to an electrostatic capacitance unit (FD) through the transfer gate and converted into a voltage signal. Although it is preferable that the depth of the photoelectric converter 301 be common to each pixel, the depth may be changed (shallowed) some pixels (such as the pixel 200B having a spectral sensitivity of B).

Figure 4:
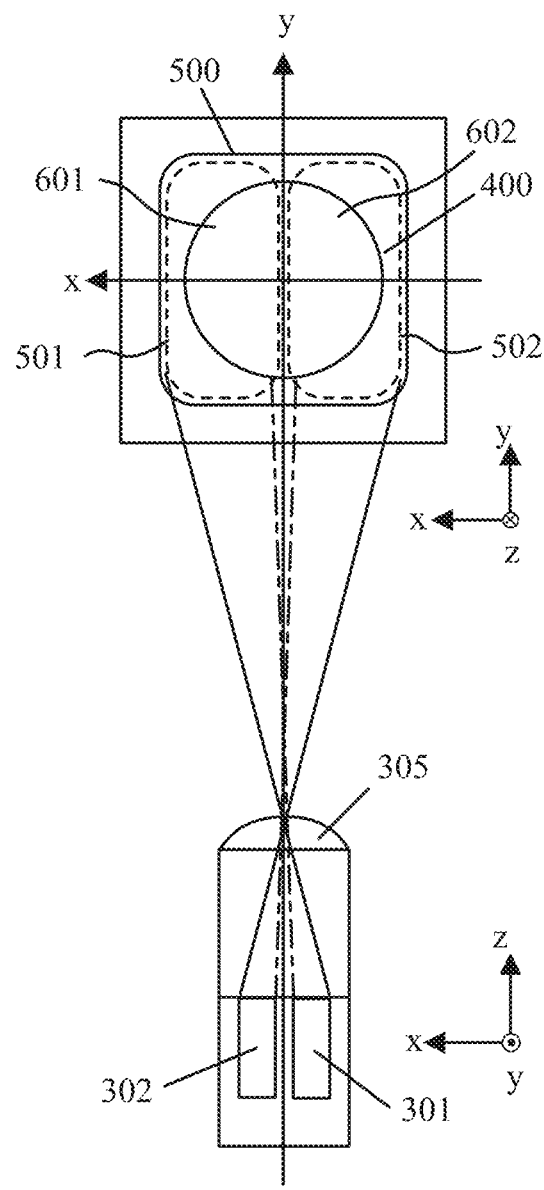
FIG. 4 is a diagram for explaining a correspondence between a pixel in an image sensor and a partial pupil area according to the first embodiment.

Referring now to FIG. 4, a description will be given of the pupil division function of the image sensor 107. FIG. 4 is a diagram for explaining the correspondence between the pixel 200G of the image sensor 107 and the partial pupil area. FIG. 4 is a sectional view of the a-a section of the pixel structure illustrated in FIG. 3A viewed from the +y side, and illustrates an exit pupil plane of the imaging optical system. In FIG. 4, in order to correspond to the coordinate axis of the exit pupil plane, the x-axis and y-axis of the sectional view are respectively inverted with respect to the x-axis and y-axis in FIGS. 3A and 3B.

A light flux from the object passes through an exit pupil 400 in the imaging optical system and enters each pixel. A pupil area 500 is a pupil area in the pupil area of the imaging optical system that can be received by the entire pixel 200G when all the photoelectric converters 301 and 302 (subpixels 201 and 202) are combined. A partial pupil area (first partial pupil area) 501 has a substantially conjugate relationship via the micro lens 305 with a light receiving plane of the photoelectric converter 301 whose center of gravity is decentered in the −x direction. Thus, the partial pupil area 501 represents a pupil area that can be received by the subpixel 201. The center of gravity of the partial pupil area 501 is decentered on the pupil plane toward the +x side. A partial pupil area (second partial pupil area) 502 is in a substantially conjugate relationship via the micro lens 305 with the light receiving plane of the photoelectric converter 302 whose center of gravity is decentered in the +x direction. Thus, the partial pupil area 502 represents a pupil area that can be received by the subpixel 202. The center of gravity of the partial pupil area 502 of the subpixel 202 is decentered on the pupil plane toward the −x side.

The subpixel 201 actually receives light from an AF pupil (first AF pupil) 601, which is an area where the exit pupil 400 and the partial pupil area 501 overlap each other. The subpixel 202 actually receives the light from an AF pupil (second AF pupil) 602 which is an area where the exit pupil 400 and the partial pupil area 502 overlap each other.

Figure 5:
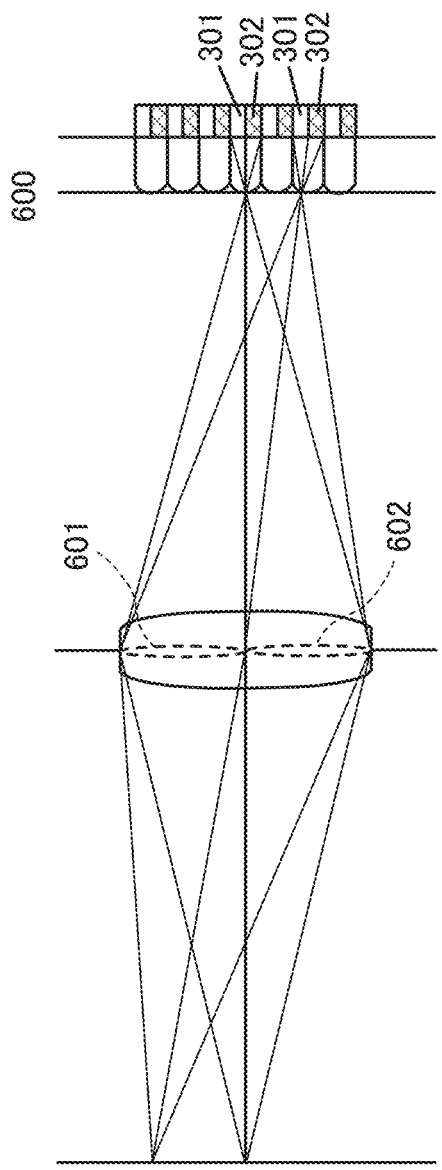
FIG. 5 is a diagram for explaining a pupil division in an imaging optical system and the image sensor according to the first embodiment.

FIG. 5 is a diagram for explaining a pupil division in the imaging optical system and the image sensor 107. The light fluxes having passed through the AF pupils 601 and 602 enter an imaging plane 600 of the image sensor 107 at different angles relative to each pixel of the image sensor 107 and are received by the 2×1 divided subpixels 201 and 202. This embodiment describes an example in which the pupil area is divided into two in the horizontal direction, but the present invention is not limited to this embodiment and the pupil division may be performed in the vertical direction if necessary.

In this embodiment, the image sensor 107 includes a plurality of subpixels which share one micro lens and receive a plurality of light fluxes passing through different pupil areas in the imaging optical system (imaging lens). The image sensor 107 includes, as a plurality of subpixels, a first subpixel (a plurality of subpixels 201) and a second subpixel (a plurality of subpixels 202). In addition, the imaging optical system may have an array of pixels that receive light fluxes passing through the combined area of the AF pupils 601 and 602. In the image sensor 107, each pixel has first and second subpixels. However, if necessary, the imaging pixels and the first and second subpixels may be separate pixel configurations, and the first and second subpixels may be partially disposed in part of the imaging pixel array.

This embodiment generates a first focus detection signal based on the pixel signal of the subpixel 201 of each pixel of the image sensor 107, and a second focus detection signal based on the pixel signal of the subpixel 202 of each pixel, and performs a focus detection. Further, this embodiment can generate an imaging signal (captured image) having a resolution of the effective pixel number N by adding and reading the signals of the subpixels 201 and 202 for each pixel of the image sensor 107.

[Relationship Between Defocus Amount and Image Shift Amount]

Figure 6:
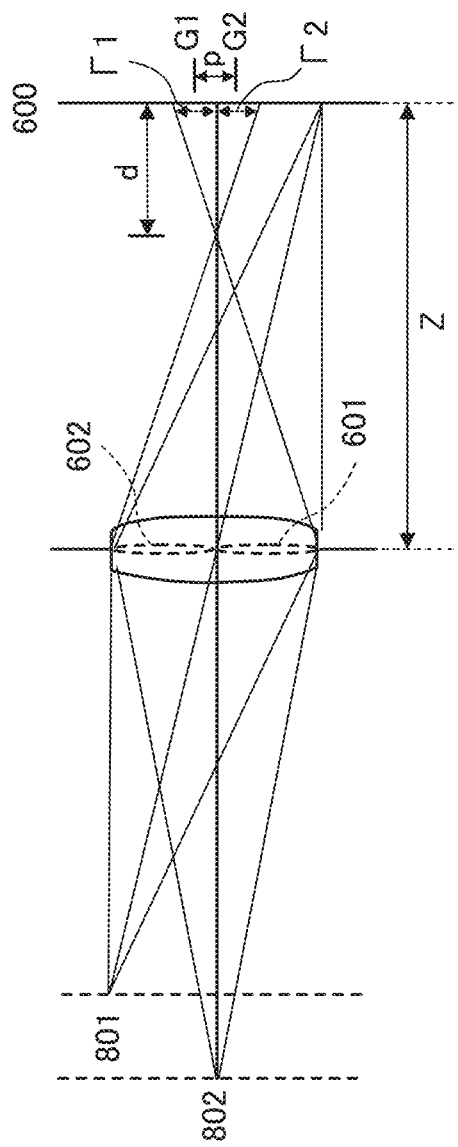
FIG. 6 is a diagram showing a relationship between a defocus amount and an image shift amount according to the first embodiment.

Referring to FIG. 6, a description will be given of a relationship between the defocus amount and the image shift amount of the first focus detection signal acquired from the subpixel 201 and the second focus detection signal acquired from the subpixel 202 in the image sensor 107. FIG. 6 is a diagram showing the relationship between the defocus amount and the image shift amount. FIG. 6 illustrates that the image sensor 107 is disposed on the imaging plane 600, and similar to FIGS. 4 and 5, the exit pupil 400 of the imaging optical system is divided into two AF pupils 601 and 602.

A defocus amount d is defined, such that |d| is a distance from the imaging position of the object to the imaging plane 600, a front focus state where the imaging position is closer to the object than the imaging plane 600 is expressed with a negative sign (d<0), and a back focus state where the imaging position is located on the side opposite to the object of the imaging plane 600 is expressed with a positive code (d>0). In the in-focus state where the imaging position of the object is located at the imaging plane 600 (in-focus position), the defocus amount d=0 is established. FIG. 6 illustrates an object 801 corresponding to the in-focus state (d=0), and an object 802 corresponding to the front focus state (d<0). The front focus state (d<0) and the back focus state (d>0) will be collectively referred to as a defocus state (|d|>0).

In the front focus state (d<0), among the light fluxes from the object 802, the light fluxes that have passed through the AF pupil 601 (or the AF pupil 602) are condensed once. Then, the light flux spreads with a width Γ1 (Γ2) centered on a gravity center position G1 (G2) of the light flux, and provided an image blurred on the imaging plane 600. The blurred image is received by the subpixels 201 (subpixels 202) constituting the respective pixels arranged in the image sensor 107, and a first focus detection signal (second focus detection signal) is generated. Hence, the first focus detection signal (second focus detection signal) is recorded as an object image in which the object 802 is blurred with the width Γ1 (Γ2) at the gravity center position G1 (G2) on the imaging plane 600. The blur width Γ1 (Γ2) of the object image generally increases in proportion to the increase of the magnitude |d| of the defocus amount d. Similarly, a magnitude |p| of an image shift amount p of the object image between the first focus detection signal and the second focus detection signal (=difference G1−G2 between the gravity center positions of the light fluxes) generally proportionally increases as the magnitude |d| of defocus amount d increases. The same applies to the back focus state (d>0), but the image shift direction of the object image between the first focus detection signal and the second focus detection signal is opposite to that in the front focus state.

Thus, in this embodiment, the magnitude of the image shift amount between the first focus detection signal and the second focus detection signal increases, as the magnitude of the first focus detection signal and the second focus detection signal or the defocus amount of the imaging signal obtained by adding the first and second focus detection signals to each other increases.

This embodiment provides phase difference type focusing using the relationship between the defocus amount and the image shift amount between the first focus detection signal and the second focus detection signal.

The phase difference type focusing shifts the first focus detection signal and the second focus detection signal relative to each other, calculates a correlation amount representing the signal coincidence degree, and detects the image shift amount based on the shift amount that improves the correlation (signal coincidence degree). Since the magnitude of the image shift amount increases between the first focus detection signal and the second focus detection signal, as the magnitude of the defocus amount of the imaging signal increases, the focus detection is performed by converting the image shift amount into the defocus amount.

[Pupil Shift and Frame Shielding]

Figures 7A, 7B, 7C:
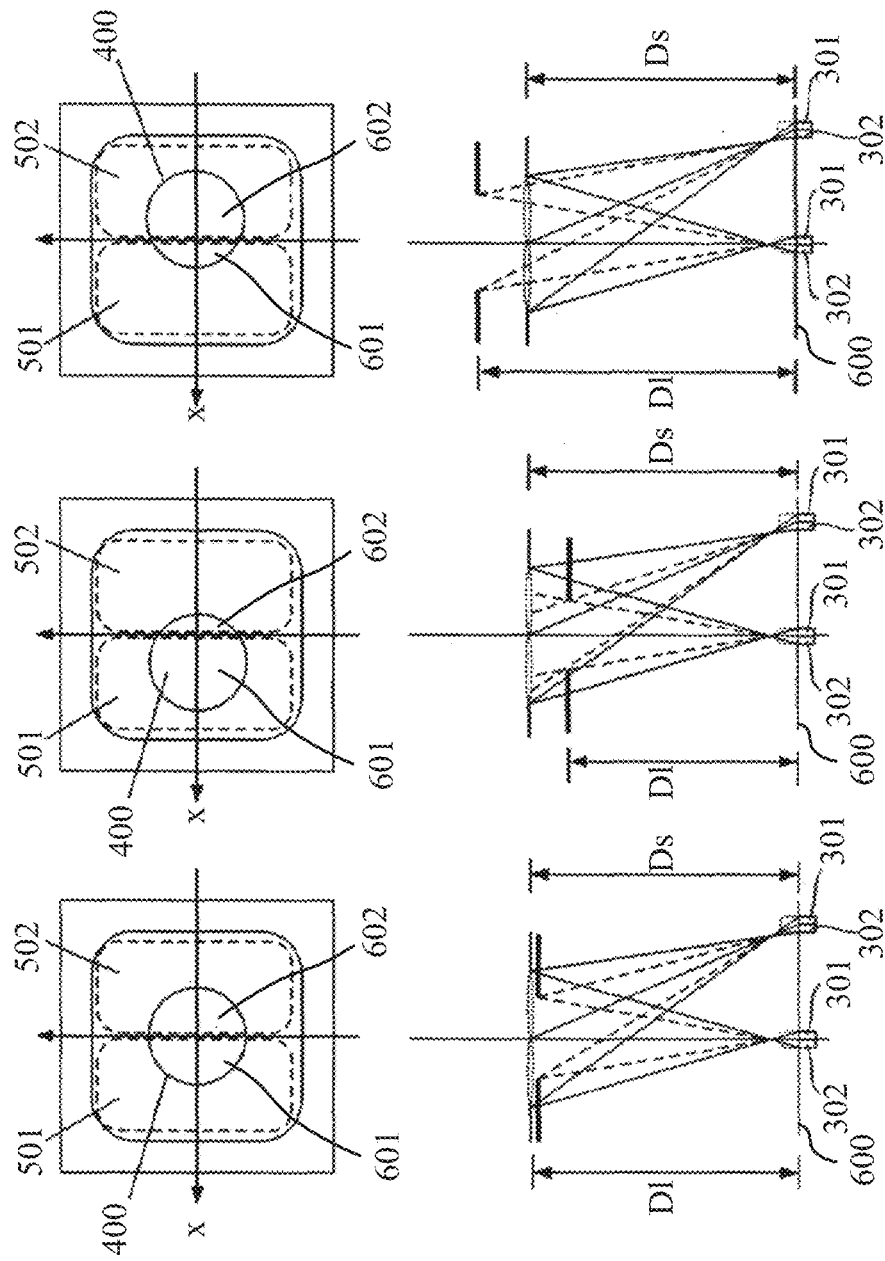
FIGS. 7A, 7B, and 7C are explanatory views of an effective F-number caused by a pupil shift according to the first embodiment.

Referring now to FIGS. 7A, 7B, and 7C, a description will be given of a pupil shift at the peripheral image height of the image sensor 107. FIGS. 7A, 7B, and 7C are explanatory views of an effective F-number (effective aperture value) caused by the pupil shift, and the relationship between the AF pupils 601 and 602 respectively corresponding to the subpixels 201 and 202 of respective pixels arranged at the peripheral image heights of the image sensor 107, and the exit pupil 400 in the imaging optical system.

FIG. 7A illustrates that an exit pupil distance D1 of the imaging optical system (distance between the exit pupil 400 and the imaging plane 600) and a set pupil distance Ds of the image sensor 107 are substantially equal to each other. In this case, similar to the central image height, the exit pupil 400 in the imaging optical system is divided substantially uniformly by the AF pupils 601 and 602 at the peripheral image height.

As illustrated in FIG. 7B, when the exit pupil distance D1 of the imaging optical system is shorter than the set pupil distance Ds of the image sensor 107, there is a pupil shift between the exit pupil 400 of the imaging optical system and the entrance pupil of the image sensor 107, at the peripheral image height of the image sensor 107. Hence, the exit pupil 400 of the imaging optical system is unevenly divided. In FIG. 7B, the effective F-number of the subpixel 201 corresponding to the AF pupil 601 is smaller (brighter) than the effective F-number of the subpixel 202 corresponding to the AF pupil 602. On the other hand, at the image height on the opposite side, the effective F-number of the subpixel 201 corresponding to the AF pupil 601 is larger (darker) than the effective F-number of the subpixel 202 corresponding to the AF pupil 602.

As illustrated in FIG. 7C, when the exit pupil distance D1 of the imaging optical system is longer than the set pupil distance Ds of the image sensor 107, there is a pupil shift between the exit pupil 400 of the imaging optical system and the entrance pupil of the image sensor 107, at the peripheral image height of the image sensor 107. Thus, the exit pupil 400 of the imaging optical system is unevenly divided. In FIG. 7C, the effective F-number of the subpixel 201 corresponding to the AF pupil 601 is larger (darker) than the effective F-number of the subpixel 202 corresponding to the AF pupil 602. On the other hand, at the image height on the opposite side, the effective F-number of the subpixel 201 corresponding to the AF pupil 601 is smaller (brighter) than the effective F-number of the subpixel 201 corresponding to the AF pupil 602.

As the pupil division becomes uneven at the peripheral image eight due to the pupil shift, the effective F-numbers of the subpixels 201 and 202 also become uneven. Thus, the blur spread of either one of the first focus detection signal and the second focus detection signal becomes wider, and the other blur spread becomes narrower. It is thus preferable that in a predetermined area of the image, among the plurality of focus detection signals, the weight coefficient of the focus detection signal output by the subpixel having the smallest effective F-number can be minimized or the weight coefficient of the focus detection signal output by the subpixel having the largest effective F-number can be maximized.

[Pupil Division]

Figure 8A:
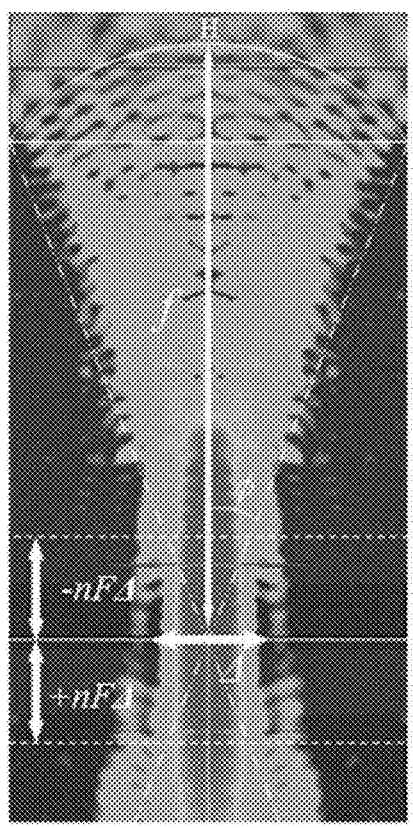
FIGS. 8A and 8B are explanatory views of a light intensity distribution when light enters a micro lens formed on each pixel according to the first embodiment.
Figure 8B:
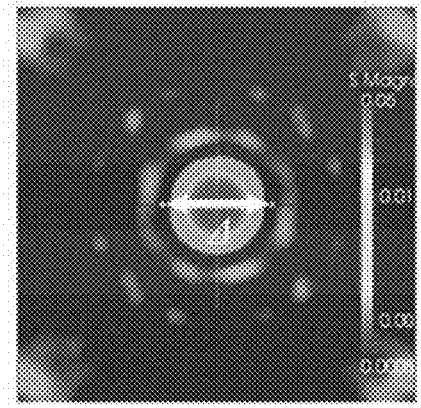

FIGS. 8A and 8B are explanatory views of the light intensity distribution when the light enters the micro lens 305 formed in each pixel. FIGS. 8A and 8B illustrate a calculation example of the light intensity distribution inside the image sensor 107 when a plane wave of the right circularly polarized light with a wavelength λ=540 nm is incident from the micro lens 305 parallel to the optical axis. The numerical calculation used an FDTD (Finite Difference Time Domain) method.

FIG. 8A illustrates the light intensity distribution on a section parallel to the optical axis of the micro lens. The micro lens optical system in each pixel includes a micro lens 305, a planarization layer, a sealing layer, an insulating layer, and the like. The micro lens optical system may include a plurality of micro lenses. Assume that the pixel period is 2a, the focal length of the micro lens optical system is f, and the aperture angle of the micro lens optical system is 2φ. Further, the refractive index at the focal position of the micro lens optical system is n. A coordinate along the optical axis is set to z. In the coordinate z, the focal position is set to an origin (z=0), the micro lens side is set to a negative sign, and the opposite side to the micro lens is set to a positive sign. H is a main point.

An numerical aperture NA of the micro lens optical system is defined by the following expression (1).

$$NA = n \sin \phi \quad (1)$$

Further, the F-number F of the micro lens optical system is defined by the following expression (2).

$$F = \frac{1}{2n\sin\phi} = \frac{f}{2na} \quad (2)$$

The incident light is condensed on a focal position by the micro lens optical system. However, due to the influence of the diffraction of the light wave nature, the diameter of the condensed spot cannot be made smaller than the diffraction limit Δ, and has a finite size. Assume that the intensity distribution of the condensed spot is close to the Airy pattern. Then, the diffraction limit Δ can be approximately obtained by the following expression (3), where λ is the wavelength of the incident light.

$$\Delta = 1.22 \frac{\lambda}{n\sin\phi} = 2.44\lambda F \quad (3)$$

The size of the light receiving plane of the photoelectric converter is about 1 to 2 μm, whereas the condensed spot of the micro lens is about 1 μm. Thus, the AF pupils 601 and 602 in FIG. 4 that are in a conjugate relationship with the light receiving plane of the photoelectric converter via the micro lens are not clearly divided due to the diffraction blurs, and form the light receiving rate distribution (pupil intensity distribution) dependent on the incident angle of light.

FIG. 8B illustrates the light intensity distribution on a section perpendicular to the optical axis of the micro lens at the focal position of the micro lens. At the point position (z=0), the diameter of the condensed spot becomes the diffraction limit Δ and the smallest.

The back focus depth $+z_D$ and the front focus depth $-z_D$ of the micro lens optical system can be obtained by the following expression (4) with the diffraction limit Δ being a permissible circle of confusion. The range of depth of focus is $-zD > z > +zD$.

$$\pm z_D = \pm nF\Delta \quad (4)$$

Assume that the intensity distribution of the condensed spot is close to a Gaussian distribution. Then, a diameter w of the condensed spot substantially satisfies the following expression (5) as a function of the coordinate z.

$$w(z) = \Delta \sqrt{1 + \left(\frac{z}{z_R}\right)^2} \quad (5)$$

Herein, $z_R$ is a Rayleigh length, and is defined as $z_R = \alpha_R zD$ by setting a coefficient $\alpha_R$ to 0.61 π≈1.92.

In the calculation example illustrated in FIGS. 8A and 8B, the wavelength λ is 540 nm, the pixel period $2a$ is 4.3 μm, the focal length f of the micro lens optical system f is 5.8 μm, and the refractive index n is 1.46 at the focal position. The F-number of the micro lens optical system is F=0.924, the diffraction limit is Δ=1.22 μm, and the depth of focus is $z_D$=1.65 μm.

[AF Pupil Shape]

Figure 9:
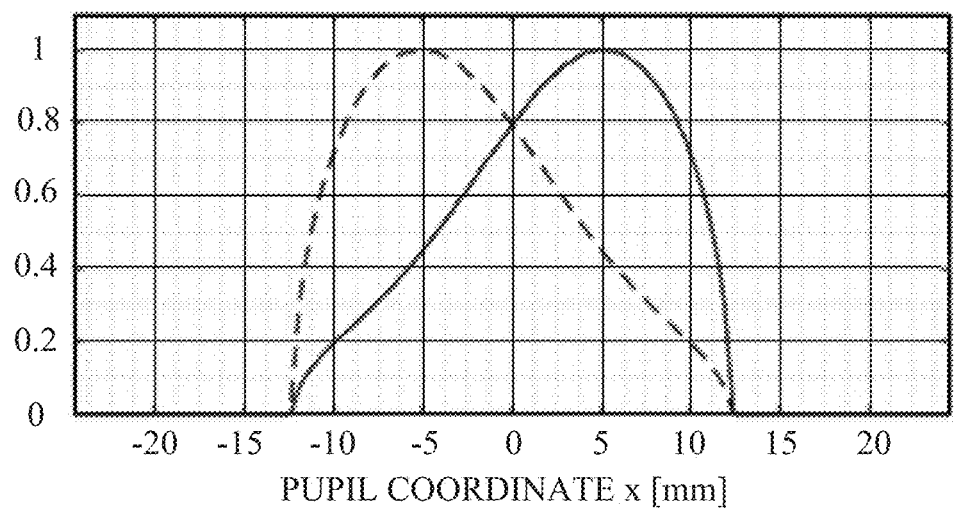
FIG. 9 is a view showing a pupil intensity distribution according to the first embodiment.

FIG. 9 is a diagram showing a pupil intensity distribution, and the abscissa axis represents the X axis of the exit pupil plane of the imaging optical system, and the ordinate axis represents the light receiving rate. A solid line represents a pupil intensity distribution $h_A(x)$ obtained by a projection conversion of the AF pupil 601 in FIG. 4 into the y-axis direction and by forming a one-dimension in the x-axis direction. A broken line represents a pupil intensity distribution $h_B(x)$ obtained by a projection conversion of the AF pupil 602 into the y-axis direction and by forming a one-dimension in the x-axis direction.

The +x side of the pupil intensity distribution $h_A(x)$ shows a sharp curve because it is shielded by the exit pupil defined by the lens frame and the diaphragm frame in the imaging optical system. Further, on the −x side, the boundary of the partial pupil area is blurred due to the pupil division by the micro lens and the influence of the diffraction, and a gentle curve is formed. On the other hand, the pupil intensity distribution $h_B(x)$ has a form obtained by inverting the positive and negative of the x axis of the pupil intensity distribution $h_A(x)$. Thus, the pupil intensity distribution $h_A(x)$ and the pupil intensity distribution $h_B(x)$ do not have the same shape, and the coincidence degree lowers in the parallel movement (shifting) and superposition. Further, the shape of the pupil intensity distribution is also determined by the spectral sensitivity characteristic of the image sensor 107. Furthermore, the shape of the pupil intensity distribution is also determined by the state of the pupil shift and the frame shielding that depend on an image height between the exit pupil 400 of the imaging optical system and the entrance pupil (partial pupil areas 501 and 502) of the image sensor 107 described above with reference to FIGS. 7A, 7B, and 7C.

Figure 10A:
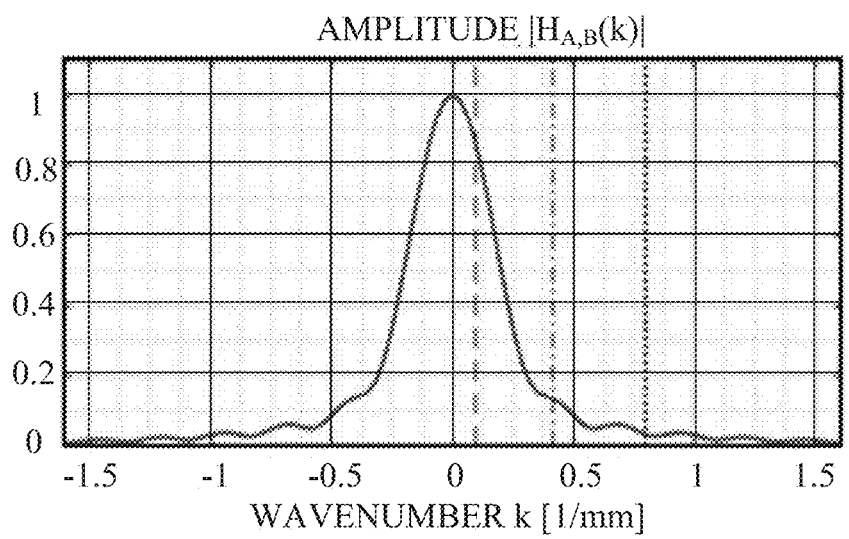
FIGS. 10A, 10B, and 10C illustrate a Fourier-transformed pupil intensity distribution according to the first embodiment.
Figure 10B:
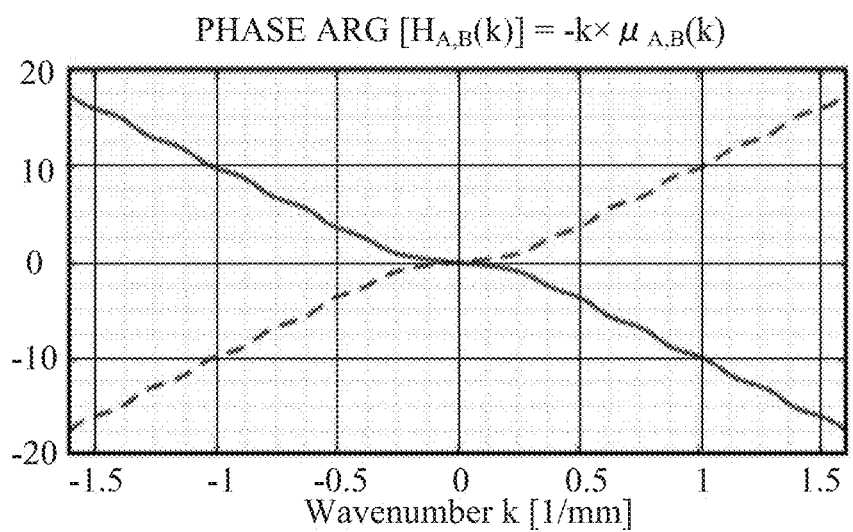
Figure 10C:
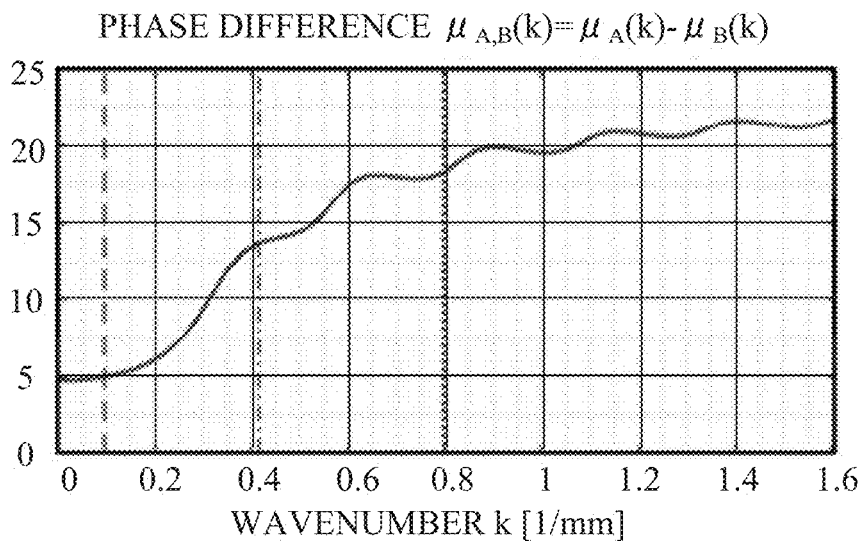

FIGS. 10A, 10B, and 10C illustrate that the pupil intensity distribution $h_A(x)$ and the pupil intensity distribution $h_B(x)$ are Fourier transformed. The Fourier transform $H_A(k)$ of the pupil intensity distribution $h_A(x)$ and the Fourier transform $H_B(k)$ of the pupil intensity distribution $h_B(x)$ are represented by the following expression (6). The Fourier transforms $H_A(k)$ and $H_B(k)$ are collectively expressed as $H_{A,B}(k)$. Further, the components $\mu_A(k)$ and $\mu_B(k)$ that constitute the phase component are collectively expressed as $\mu_{A,B}(k)$. Herein, k is a wave number.

$$H_{A,B}(k) = FT[h_{A,B}(x)] = |H_{A,B}(k)|e^{-ik\mu_{A,B}(k)}, \frac{d\mu_A(k)}{dk} \geq 0, \frac{d\mu_B(k)}{dk} \leq 0 \quad (6)$$

FIG. 10A illustrates the amplitude component ($|H_{A,B}(k)|$) of the Fourier transforms $H_A(k)$ and $H_B(k)$. Since the pupil intensity distributions $h_A(x)$ and $h_B(x)$ illustrated in FIG. 9 are in a substantially mirror-inverted relationship, the absolute values of the Fourier transforms substantially accord with each other. In addition, it may change depending on the states of pupil shift and frame shielding.

FIG. 10B illustrates phase components (phase transfer functions) of the Fourier transforms $H_A(k)$ and $H_B(k)$. A solid line represents a phase component ($-k \times \mu_A(k)$) of the Fourier transform $H_A(k)$. Since the component $\mu_A(k)$ constituting the phase component increases substantially monotonously according to the expression (6), the solid line substantially monotonically decreases. A broken line represents the phase component ($-k \times \mu_B(k)$) of the Fourier transform $H_B(k)$. Since the component $\mu_B(k)$ constituting the phase component decreases substantially monotonously according to expression (6), the solid line substantially monotonically increases.

FIG. 10C illustrates the phase difference $\mu_{AB}(k)$ of Fourier transforms $H_A(k)$ and Fourier transform $H_A(k)$. The phase difference $\mu_{AB}(k)$ is expressed by the following expression (7).

$$\mu_{AB}(k) = \mu_A(k) - \mu_B(k), \frac{d\mu_{AB}(k)}{dk} \geq 0 \quad (7)$$

Figure 11A:
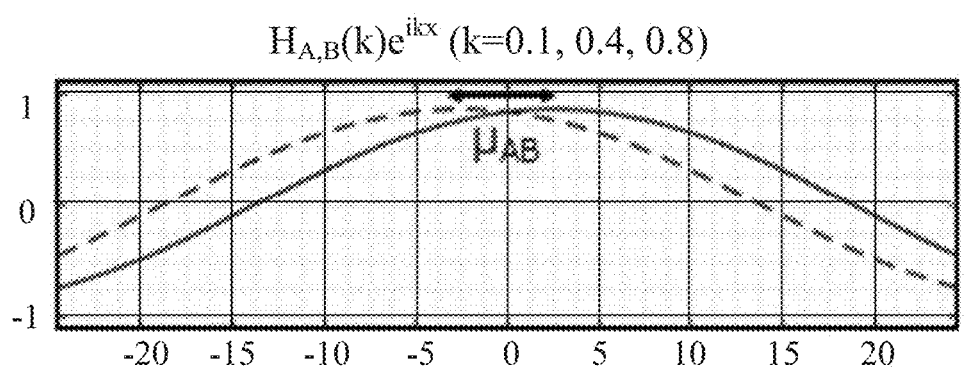
FIGS. 11A, 11B, and 11C is a diagram showing components of the pupil intensity distribution for each spatial frequency according to the first embodiment.
Figure 11B:
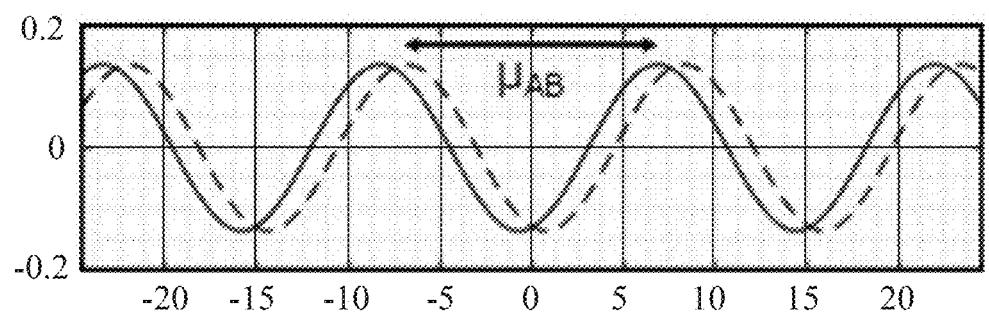
Figure 11C:
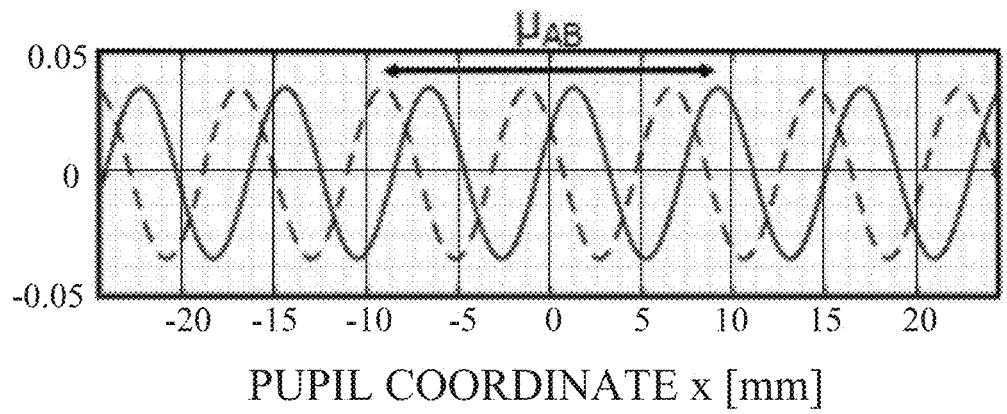

FIGS. 11A, 11B, and 11C show components of the pupil intensity distributions $h_A(x)$ and $H_B(x)$ for each spatial frequency. FIG. 11A illustrates components where the wave number k represented by the solid lines in FIGS. 10A and 10C is 0.1. FIG. 11B illustrates components where the wave number k represented by the alternate long and short dash lines in FIGS. 10A and 10C is 0.4. FIG. 11C represents the components where the wave number k represented by the dotted lines in FIGS. 10A and 10C is 0.8. As illustrated in FIGS. 11A, 11B, and 11C, the phase difference $\mu_{AB}$ becomes smaller as the wave number k becomes smaller. Therefore, the phase difference $\mu_{AB}(k)$ changes in accordance with the wave number k, as illustrated in FIG. 10C. This is because the shapes of the pupil intensity distributions $h_A(x)$ and $h_B(x)$ are different as illustrated in FIG. 9.

A line image $h_A(x|d)$ of the first focus detection signal and a line image $h_B(x|d)$ of the second focus detection signal are obtained by scaling the pupil intensity distributions $h_A(x)$ and $h_B(x)$ according to the exit pupil distance of the imaging optical system and the defocus amount. Since the line images $h_A(x|d)$ and $h_B(x|d)$ have substantially similar relationships to the pupil intensity distributions $h_A(x)$ and $H_B(x)$ respectively, they have the shapes illustrated in FIG. 9. In other words, the shapes of the pupil intensity distributions $h_A(x)$ and $h_B(x)$ are determined based on at least one of the spectral sensitivity characteristic of the image sensor 107, the lens frame of the imaging optical system, and the diaphragm frame of the imaging optical system.

Assume that Z is the exit pupil distance (distance between the exit pupil plane and the imaging plane 600) of the imaging optical system illustrated in FIG. 6 and d is the defocus amount. Then, the line images $h_A(x|d)$ and $h_B(x|d)$ are represented by the following expression (8). The line images $h_A(x|d)$ and $h_B(x|d)$ are collectively expressed as $h_{A,B}(x|d)$. The exit pupil distance Z is assumed to be sufficiently larger than the defocus amount d.

$$h_{A,B}(x|d) = \left|\frac{z}{d}\right| h_{A,B}\left(\frac{z}{d}x\right) \quad (8)$$

A Fourier transform $H_A(k|d)$ of the line image $h_A(x|d)$ and a Fourier transform $H_B(k|d)$ of the line image $h_B(x|d)$ are represented by the following expression (9), and the symmetry function is invariant to the replacement of the wave number k and the defocus amount d. The Fourier transforms $H_A(k|d)$ and $H_B(k|d)$ are collectively expressed as $H_{A,B}(k|d)$.

$$H_{A,B}(k|d) = FT[h_{A,B}(x|d)] = H_{A,B}\left(\frac{d}{Z}k\right) = \left|H_{A,B}\left(\frac{d}{Z}k\right)\right| e^{-i\frac{d}{Z}k\mu_{A,B}\left(\frac{d}{Z}k\right)} \quad (9)$$

Assume that the light amount distribution of the object is f(x). Then, the first focus detection signal $g_A(x|d)$ and the second focus detection signal $g_B(x|d)$ in the defocus state of the defocus amount d are represented by the following expression (10) based on the relational expressions of the convolution and the Fourier transform. The first focus detection signal $g_A(x|d)$ and the second focus detection signal $g_B(x|d)$ are collectively expressed as $g_{A,B}(x|d)$.

$$g_{A,B}(x|d) = \int_{-\infty}^{\infty} dx' h_{A,B}(x - x'|d) f(x') \quad (10)$$

$$= \int_{-\infty}^{\infty} \frac{dk}{2\pi} |F(k)| e^{ik\varphi(k)} \left|H_{A,B}\left(\frac{d}{Z}k\right)\right| e^{ik\left[x - \frac{d}{Z}\mu_{A,B}\left(\frac{d}{Z}k\right)\right]}$$

In the focus detection processing, in order to stably perform a focus detection of a low-contrast object or the like, the DC component and high frequency noise are cut by a band-pass filter, the first and second focus detection signals $g_A(x|d)$ and $g_B(x|d)$ are limited to the vicinity of a specific wave number $k_{AF}$ component, and a focus detection is performed. The first focus detection signal $g_A(x|d, k_{AF})$ and the second focus detection signal $g_B(x|d, k_{AF})$ limited to the wave number $k_{AF}$ component are expressed by the following expression (11).

$$g_{A,B}(x|d, k_{AF}) = \quad (11)$$
$$\frac{1}{2\pi} |F(k_{AF})| e^{ik_{AF}\varphi(k_{AF})} \left|H_{A,B}\left(\frac{d}{Z}k_{AF}\right)\right| e^{ik_{AF}\left[x - \frac{d}{Z}\mu_{A,B}\left(\frac{d}{Z}k_{AF}\right)\right]}$$

Thus, the phase difference between the first focus detection signal $g_A(x|d, k_{AF})$ and the second focus detection signal $g_B(x|d, k_{AF})$ limited to the wave number $k_{AF}$ component at the defocus amount d is the image shift amount q at the wave number $k_{AF}$, and expressed by the following expression (12).

$$q = \left[\frac{d}{Z}\mu_A\left(\frac{d}{Z}k_{AF}\right)\right] - \left[\frac{d}{Z}\mu_B\left(\frac{d}{Z}k_{AF}\right)\right] = \frac{\mu_{AB}\left(\frac{d}{Z}k_{AF}\right)}{Z}d \quad (12)$$

Herein, the conversion coefficient $K_0$ for the image shift amount $q_0$ of the defocus amount $d_0$ is expressed by the following expression (13).

$$K_0 = \frac{Z}{\mu_{AB}\left(\frac{d_0}{Z}k_{AF}\right)} \quad (13)$$

The detected defocus amount $d_{det}$ is expressed by the following expression (14) using the conversion coefficient $K_0$.

$$d_{det} = K_0 q = \frac{Z}{\mu_{AB}\left(\frac{d_0}{Z}k_{AF}\right)} \frac{\mu_{AB}\left(\frac{d}{Z}k_{AF}\right)}{Z} d = \frac{\mu_{AB}\left(\frac{d}{Z}k_{AF}\right)}{\mu_{AB}\left(\frac{d_0}{Z}k_{AF}\right)} d \quad (14)$$

As described above, the phase difference $\mu_{AB}(k)$ ($=\mu_A(k)-\mu_B(k)$) in the expression (7) changes depending on the wave number k. On the other hand, when the wave number k is fixed to the wave number $k_{AF}$, the phase difference $\mu_{AB}$ ($dk_F/Z$) in the fourth term in the expression (14) changes depending on the defocus amount d. When the abscissa axis in FIG. 10C is replaced by the wave number k with the defocus amount d, the phase difference $\mu_{AB}(dk_{AF}/Z)$ changes as illustrated in FIG. 10C according to the defocus amount d.

Figure 12:
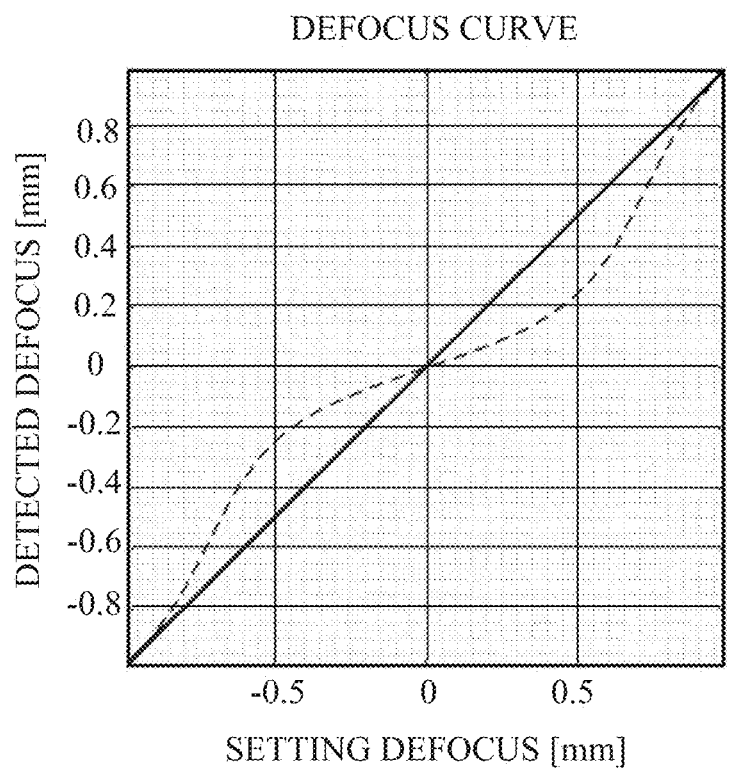
FIG. 12 is a diagram showing a relationship between a set defocus amount and a detected defocus amount according to the first embodiment.

FIG. 12 is a diagram showing a relationship between the set defocus amount d and the detected defocus amount $d_{det}$. The detected defocus amount $d_{det}$ ideally changes in proportion to the set defocus amount d, as shown by the solid line in FIG. 12. However, in practice, the detected defocus amount $d_{det}$ changes as shown by the broken line in FIG. 12 because the phase difference $\mu_{AB}(dk_{AF}/Z)$ depends on the magnitude of the set defocus amount d.

Accordingly, this embodiment calculates the set defocus amount (corrected defocus amount) d by correcting the detected defocus amount $d_{det}$, and performs the focus detection processing based on the corrected defocus amount.

This embodiment calculates the set defocus amount (corrected defocus amount) d by the following expression (15) using the detected defocus amount $d_{det}(K_0 q)$ and the correction coefficient S.

$$d = \frac{\mu_{AB}\left(\frac{d_0}{Z}k_{AF}\right)}{\mu_{AB}\left(\frac{d}{Z}k_{AF}\right)} K_0 q = S(d) K_0 q \cong S(K_0 q) K_0 q \quad (15)$$

In the expression (15), in the focus detection, since the set defocus amount d is unknown, the set defocus amount d is replaced with the detected defocus amount $d_{det}(=K_0 q)$, and the correction factor is calculated.

Figure 13:
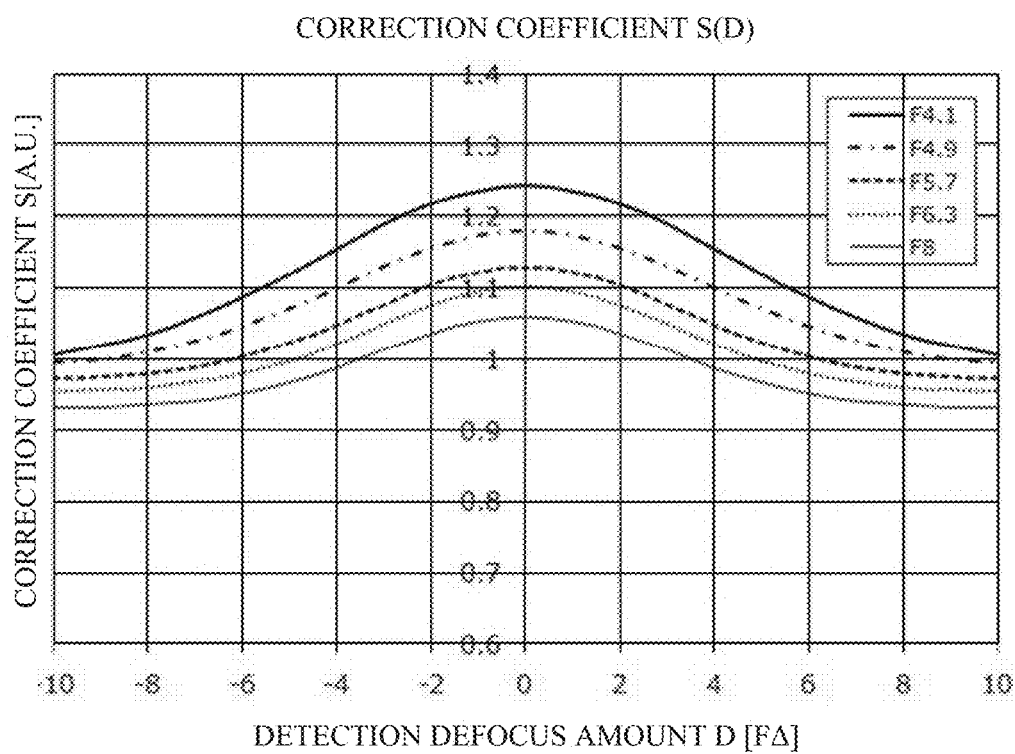
FIG. 13 is a diagram showing a correction coefficient according to the first embodiment.

FIG. 13 is a diagram showing a relationship between the detected defocus amount $d_{det}(=K_0 q)$ and the correction value $S(d_{det})$ for each F-number. The correction coefficient is set to be smaller as the absolute value of the detected defocus amount is larger, as illustrated in FIG. 13. As the absolute value of the detected defocus amount is larger, the phase difference of $\mu_{AB}$ becomes larger from the relationship of FIG. 10C and the correction coefficient becomes smaller from the expression (15). Further, as illustrated in FIG. 13, the correction coefficient is set to be larger as the absolute value of the detected defocus amount is smaller. As the absolute value of the detected defocus amount is smaller, the phase difference $\mu_{AB}$ becomes smaller from the relationship of FIG. 10C and the absolute value of the correction coefficient becomes larger from the expression (15).

This embodiment calculates the correction coefficient based on the F-number (aperture value), but the present invention is not limited to this embodiment. The correction coefficient may be calculated based on the focus detection position (image height coordinate) on the image sensor 107. Further, the correction coefficient may be calculated based on the spatial frequency band of the focus detection signal. The correction coefficient may be calculated based on the color (R/G/B) of the focus detection signal. In addition, the correction coefficient may be calculated based on the lens information (the sign of the detected defocus amount (front focus/back focus)) of the interchangeable lens acquired by the lens information acquirer 121d. The table relating to the relationship illustrated in FIG. 13 may be stored in a memory such as a storage medium 133 and a memory 134.

[Focus Detection Processing]

Figure 14:
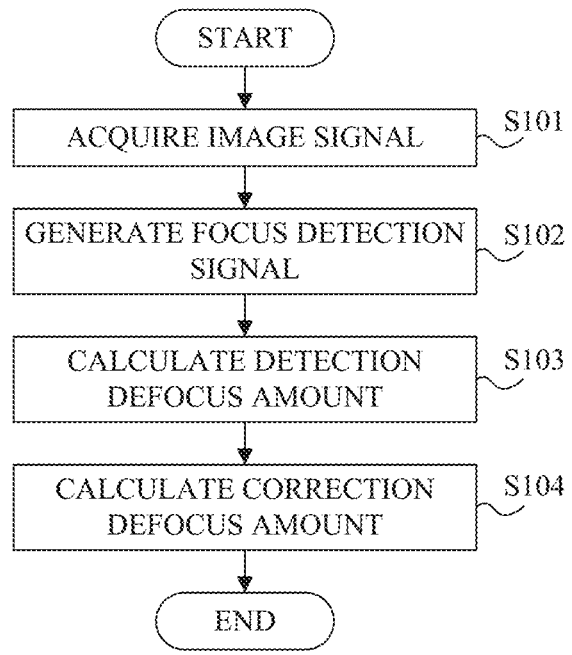
FIG. 14 is a flowchart showing a focus detection method according to the first embodiment.

Referring now to FIG. 14, a description will be given of a focus detection method according to this embodiment executed by the CPU 121. FIG. 14 is a flowchart showing the focus detection method according to this embodiment. The focus detection method according to this embodiment is implemented according to a focus detection program as a computer program operating on the software and hardware. The focus detection program may be stored, for example, in a memory (not shown) the imaging apparatus, or may be recorded on a computer-readable recording medium. While the CPU 121 executes the focus detection method according to this embodiment, a personal computer (PC) or a dedicated apparatus as a focus detection apparatus may execute the focus detection method according to this embodiment. In addition, a circuit corresponding to the focus detection program according to this embodiment may be provided and the focus detection method according to this embodiment may be implemented by operating the circuit.

In the step S101, a pixel signal acquirer 121a acquires pixel signals received by the subpixels 201 and 202 of each pixel of the image sensor 107. The image signal acquirer 121a may acquire pixel signals that are captured in advance by the image sensor 107 according to this embodiment and stored in a recording medium.

In the step S102, the signal generator 121b generates, based on the pixel signal, a first focus detection signal according to different first partial pupil areas in the imaging optical system, and a second focus detection signal according to the second partial pupil areas. A pixel signal captured by the image sensor 107 will be referred to as LF. In addition, assume that the subpixel signal in the is-th ($1 \leq is \leq Nx$) order in the column direction and the js-th ($1 \leq js \leq Ny$) in the row direction in each pixel signal of the pixel signal LF is set to an k-th subpixel signal where $k=Nx \times (js-1)+is$ ($1 \leq k \leq N_{LF}$). The k-th focus detection signal $I_k(j, i)$ in the i-th order in the column direction and the j-th order in the row direction which corresponds to the k-th partial pupil area in the imaging optical system is generated by the following expression (16).

$$I_k(j,i)=I_{N_x(j_s-1)+i_s}(j,i)=LF(N_y(j-1)+j_s,N_x(i-1)+i_s) \quad (16)$$

This embodiment shows an example with k=1 and k=2 divided into two in the x-direction in which Nx=2, Ny=1, and $N_{LF}$=2. The signals from the first subpixels 201 divided into two in the x direction are selected for each pixel based on the pixel signals corresponding to the pixel array illustrated in FIG. 2. Hence, a first focus detection signal $I_1(j, i)$ is generated as an RGB signal of the Bayer array having a resolution of the pixel number N (=horizontal pixel number NH×vertical pixel number NV) corresponding to the first partial pupil area 501 in the imaging optical system. Similarly, a second focus detection signal $I_2(j, i)$ is generated which corresponds to the second partial pupil area 502 in the imaging optical system.

In this embodiment, the first focus detection signal $I_1(j, i)$ and the second focus detection signal $I_2(j, i)$ are the first focus detection signal $g_A(x|d)$ and the second focus detection signal $g_B(x|d)$ in the expression (10).

Next, from the k-th focus detection signal $I_k$(k=1, 2) as the RGB signal of the Bayer array, the color centers of gravity of the respective color RGB are made to coincide with one another for each position (j, i), and the k-th focus detection luminance signal $Y_k$(k=1, 2) is generated by the following expression (17). If necessary, the shading (light amount) correction processing may be performed for the k-th focus detection luminance signal Yk in order to improve the focus detection accuracy.

$$Y_k(j, i) = \begin{pmatrix} I_k(j-1, i-1) & I_k(j-1, i) & I_k(j-1, i+1) \\ I_k(j, i-1) & I_k(j, i) & I_k(j, i+1) \\ I_k(j+1, i-1) & I_k(j+1, i) & I_k(j+1, i+1) \end{pmatrix} \begin{pmatrix} \frac{1}{16} & \frac{2}{16} & \frac{1}{16} \\ \frac{2}{16} & \frac{4}{16} & \frac{2}{16} \\ \frac{1}{16} & \frac{2}{16} & \frac{1}{16} \end{pmatrix} \quad (17)$$

Next, one-dimensional band pass filtering is performed for the k-th focus detection luminance signal $Y_k$(k=1, 2) in the pupil division direction (column direction), and a first focus detection signal dYA is generated which is limited to substantially the wave number $k_{AF}$ component. Further, the one-dimensional band pass filtering is performed for the second focus detection luminance signal $Y_2$ in the pupil division direction (column direction) to generate a second focus detection signal dYB approximately limited to the wave number kAF component. As the one-dimensional band-pass filter can use, for example, first order differential filters [1, 5, 8, 8, 8, 8, 5, 1 1, −1, −5, −8, −8, −8, −8, −5, −1]. The pass band of the one-dimensional band-pass filter may be adjusted, if necessary.

In this embodiment, the first focus detection signal dYA and the second focus detection signal dYB approximately limited to the wave number $k_{AF}$ component are the first focus detection signal $g_A(x|d, K_{AF})$ and the second focus detection signal $g_B(x|d, k_{AF})$ limited to the wave number $k_{AF}$ component of the expression (11).

In the step S103, the focus detector 121c calculates a detected defocus amount based on the focus detection signal.

Assume a first focus detection signal is $dYA(j_{AF}+j_2, i_{AF}+i_2)$ and a second focus detection signal is $dYB(j_{AF}+j_2, i_{AF}+i_2)$ which are limited to substantially the wave number $k_{AF}$ component in the $J_2$-th ($-n_2 \le j_2 \le n_2$) order in the row direction and in the $i_2$-th ($-m_2 \le i_2 \le m_2$) order in the column direction as the pupil division direction around the focus detection position ($j_{AF}$, $i_{AF}$) as the center. Where a shift amount is set to s ($-n_s \le s \le n_s$), a correlation amount $COR_{EVEN}(j_{AF}, i_{AF}, s)$ is calculated at each position ($j_{AF}, i_{AF}$) by the expression (18A), and a correlation amount $COR_{ODD}$ ($j_{AF}, i_{AF}, s$) is calculated at each position ($j_{AF}, i_{AF}$) by the expression (18B).

$$COR_{even}(j_{AF},i_{AF},s)=\Sigma_{j_2=-n_2}^{n_2}\Sigma_{i_2=-m_2}^{m_2}|dYA(j_{AF}+j_2,i_{AF}+i_2+s)-dYB(j_{AF}+j_2,i_{AF}+i_2-s)| \quad (18A)$$

$$COR_{odd}(j_{AF},i_{AF},s)=\Sigma_{j_2=-n_2}^{n_2}\Sigma_{i_2=-m_2}^{m_2}|dYA(j_{AF}+j_2,i_{AF}+i_2+s)-dYB(j_{AF}+j_2,i_{AF}+i_2-1-s)| \quad (18B)$$

The correlation amount $COR_{ODD}(j_{AF}, i_{AF}, s)$ is a correlation amount made by shifting to the correlation amount $COR_{EVEN}(j_{AF}, i_{AF}, s)$, by a half phase, shift amounts of the first focus detection signal dYA and the second focus detection signal dYB approximately limited to the wave number $k_{AF}$ component.

Next, from the correlation amount $COR_{EVEN}(j_{AF}, i_{AF}, s)$ and the correlation amount $COR_{ODD}(j_{AF}, i_{AF}, s)$, an average is calculated by calculating the shift amount of the real value that minimizes the correlation amount by the subpixel calculation, and an image shift amount q is detected at the focus detection position ($j_{AF}, i_{AF}$). The detected defocus amount $d_{det}$ is detected by the expression (14) using the conversion coefficient $K_0$ of the expression (13) for the image shift amount q.

For each image height position of the focus detection area, a conversion coefficient K from the image shift amount to the defocus amount is multiplied according to lens information such as an optical characteristic of the image sensor (pupil intensity distribution for each k-th subpixel), the F-number F of the imaging lens (imaging optical system), and the exit pupil distance Dl, and a defocus amount $M_{Def}(j_{AF}, i_{AF})$ is calculated at the focus detection position ($j_{AF}, i_{AF}$).

In the step S104, the focus detector 121c calculates the corrected defocus amount by correcting the detected defocus amount calculated in the step S103 using the correction coefficient.

As described above, the present invention can correct the focus detection error caused by the shape difference between the focus detection signals and execute the focus detection with high accuracy.

Second Embodiment

Figure 15:
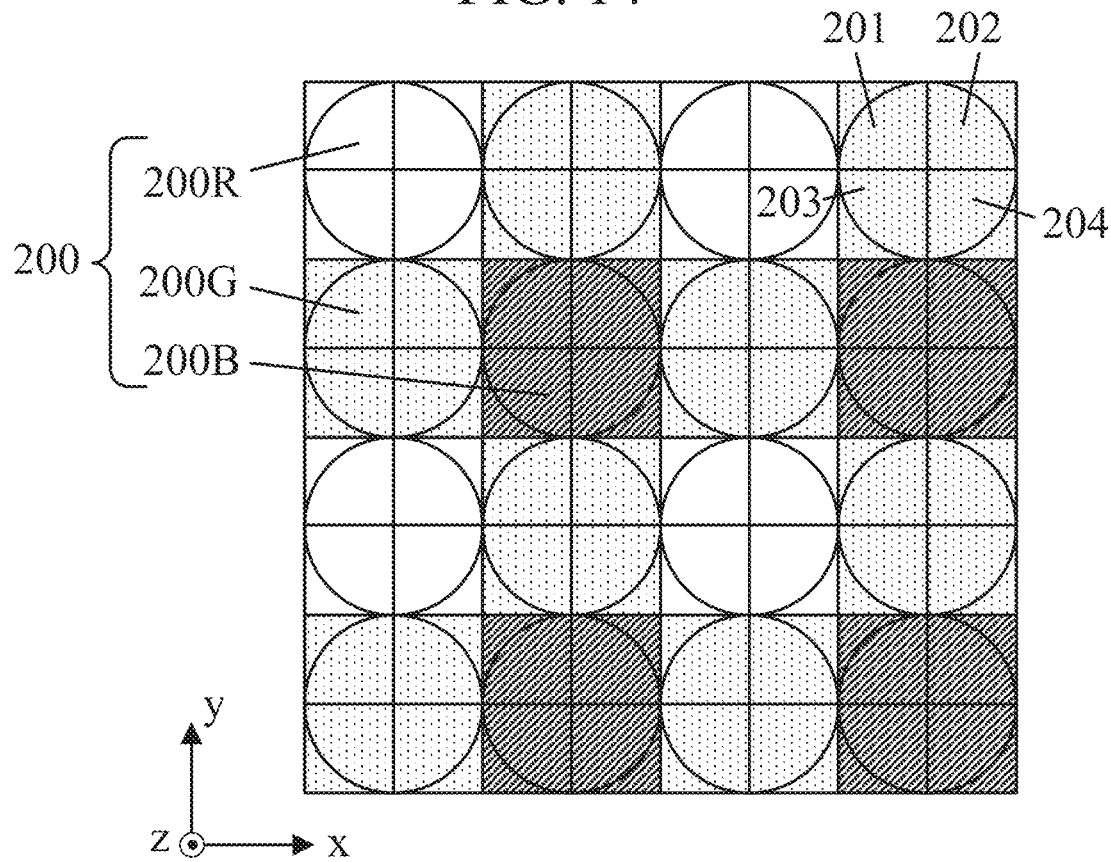
FIG. 15 is a diagram showing a pixel array according to a second embodiment.

Referring now to FIGS. 15 and 16, a description will be given of an imaging apparatus according to this embodiment. The imaging apparatus according to this embodiment is different from that of the first embodiment in the configuration of the image sensor. The other configuration is the same as that of the first embodiment, and thus a detailed description thereof will be omitted. In the imaging apparatus (two-dimensional CMOS sensor) 107 according to this embodiment, each pixel includes the first to fourth subpixels, and the signals of the first to fourth subpixels are added and read out to generate an imaging signal (captured image).

Figure 16A:
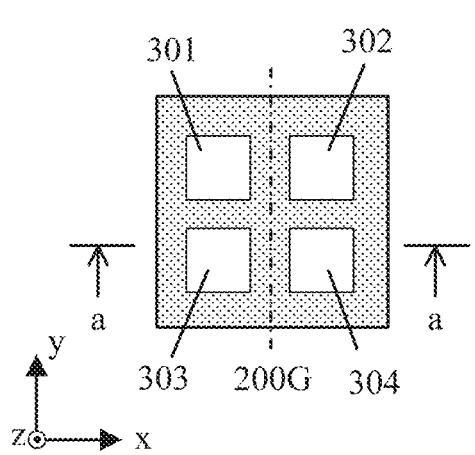
FIGS. 16A and 16B show a pixel structure according to the second embodiment.
Figure 16B:
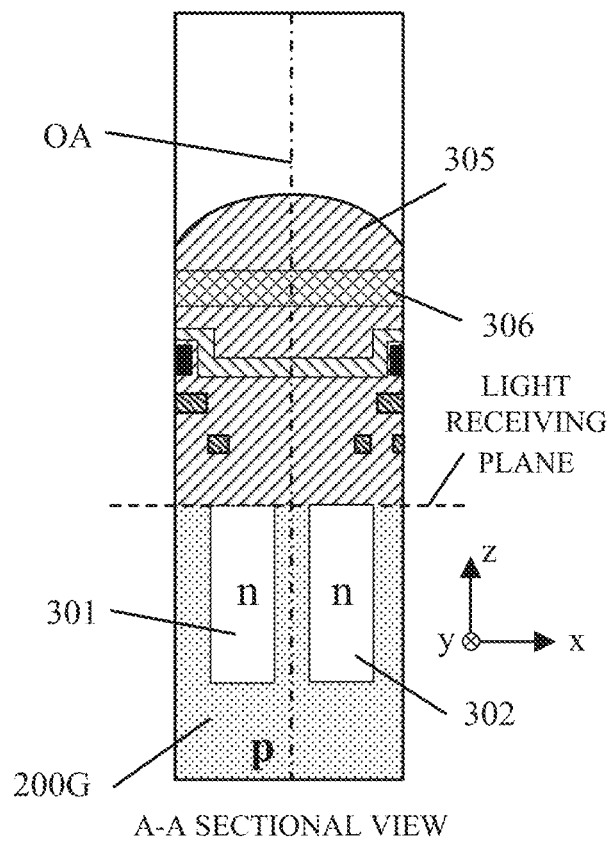

FIG. 15 is a diagram showing a pixel (imaging pixel) array of the image sensor 107. FIGS. 16A and 16B show a pixel structure of the image sensor 107. FIG. 16A is a plan view (viewed from the +z direction) of the pixel 200G of the image sensor 107, and FIG. 16B is a sectional view (viewed from the −y direction) taken along a line a-a in FIG. 16A.

FIG. 15 illustrates a pixel array of the image sensor 107 in a range of 4 columns×4 rows. In this embodiment, each pixel (pixels 200R, 200G, and 200B) has four subpixels 201, 202, 203, and 204. Hence, FIG. 15 illustrates an array of the subpixels in the range of 8 columns×8 rows.

As illustrated in FIG. 15, in the 2 column×2 row pixel unit 200, the pixels 200R, 200G, and 200B are arranged in a Bayer array. In other words, in the pixel unit 200, a pixel 200R having a spectral sensitivity of R (red) is located at the upper left, and pixels 200G each having a spectral sensitivity of G (green) are located at the upper right and the lower left, and a pixel 200B having a spectral sensitivity of B (blue) is located at the lower right. The pixels 200R, 200G, and 200B have subpixels (focus detection pixels) 201, 202, 203, and 204 arranged in 2 columns×2 rows. A subpixel (first subpixel) 201 is a pixel that receives the light flux that has passed through a first pupil area in the imaging optical system. A subpixel (second subpixel) 202 is a pixel that receives the light flux that has passed through a second pupil area in the imaging optical system. A subpixel (third subpixel) 203 is a pixel that receives the light flux that has passed through a third pupil area in the imaging optical system. A subpixel (fourth subpixel) 204 is a pixel that receives the light flux that has passed through a fourth pupil area of the imaging optical system.

As illustrated in FIG. 15, the image sensor 107 has a large number of 4 columns×4 rows of pixels (8 columns×8 rows of subpixels) arranged on the surface, and outputs an imaging signal (subpixel signal). The image sensor 107 according to this embodiment has a pixel period P of 6 μm, and a pixel number N of 6,000 rows×4000 rows=24 million pixels. Further, the image sensor 107 has a period $P_{SUB}$ of 3 μm in the column direction of the subpixels, and a subpixel number $N_{SUB}$ of 12000 horizontal rows×8000 vertical rows=96 million pixels. The pixel number is not limited to this embodiment, and 8000 or more columns may be horizontally provided to realize the 8K motion image. Further, the pixel having the subpixel and the pixel having no subpixel (non-divided pixel) may be mixed in the pixel array.

As illustrated in FIG. 16B, the pixel 200G according to this embodiment is provided with a micro lens 305 for condensing the incident light on the light receiving plane side of the pixel. A plurality of micro lenses 305 are two-dimensionally arrayed, and arranged at a position separated from the light receiving plane by a predetermined distance in the z-axis direction (the direction of the optical axis OA). Further, the pixel 200G has photoelectric converters 301, 302, 303, and 304 divided into $N_H$ in the x direction (divided into 2) and into $N_v$ in the y direction (divided into 2). The photoelectric converters 301 to 304 correspond to the subpixels 201 to 204, respectively.

This embodiment generates a first focus detection signal based on the pixel signals of the subpixels 201 and 203 of each pixel of the image sensor 107, and a second focus detection signal based on the pixel signals of the subpixels 202 and 204 of each pixel, and performs the focus detection. Further, an imaging signal (captured image) having a resolution of an effective pixel number N can be generated by adding and reading out the signals of the subpixels 201, 202, 203, and 204 for each pixel of the image sensor 107.

The first focus detection signal may be generated based on the pixel signals of the subpixels 201 and 202. At this time, the second focus detection signal is generated based on the pixel signals of the subpixels 203 and 204. In addition, the first focus detection signal may be generated based on the pixel signals of the subpixels 201 and 204. At this time, the second focus detection signal is generated based on the pixel signals of the subpixels 202 and 203. This embodiment divides the pixel into two in the x direction and the y direction, but the present invention is not limited to this embodiment. For example, it may be divided into two or more, or the number of divisions may be different between the x direction and the y direction.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention can provide a focus detection apparatus, a focus detection method, and a focus detection program, each of which can correct a focus detection error caused by a shape difference between the focus detection signals, and perform a focus detection with high accuracy.

What is claimed is:

1. A focus detection apparatus configured to perform a focus detection using a first signal and a second signal obtained by photoelectrically converting light passing through different pupil areas in an imaging optical system, the focus detection apparatus comprising:
   a calculator configured to calculate an image shift amount between the first signal and the second signal;
   a focus detector configured to calculate a first defocus amount from the image shift amount and a conversion coefficient; and
   a corrector configured to calculate a second defocus amount by correcting the first defocus amount, which is calculated by the focus detector, using a correction coefficient based on a phase transfer function corresponding to the different pupil areas, wherein the correction coefficient is used for converting the first defocus amount into the second defocus amount.

2. The focus detection apparatus according to claim 1, wherein the correction coefficient is set to be small when an absolute value of the first defocus amount is large and to be large when the absolute value is small.

3. The focus detection apparatus according to claim 1, wherein the correction coefficient is calculated based on a focus detection position on an image sensor.

4. The focus detection apparatus according to claim 1, wherein the correction coefficient is calculated based on an F-number of the imaging optical system.

5. The focus detection apparatus according to claim 1, wherein the correction coefficient is calculated based on a spatial frequency band of a focus detection signal.

6. The focus detection apparatus according to claim 1, wherein the correction coefficient is calculated based on a color of a focus detection signal.

7. The focus detection apparatus according to claim 1, wherein the correction coefficient is calculated based on a sign of the first defocus amount.

8. The focus detection apparatus according to claim 1, wherein a shape of the focus detection signal is determined based on at least one of a spectral sensitivity characteristic of an image sensor, a lens frame of the imaging optical system, and a diaphragm frame in the imaging optical system.

9. The focus detection apparatus according to claim 1, further comprising lens information acquirer configured to acquire lens information from the imaging optical system, wherein the corrector corrects the corrected defocus amount based on the lens information.

10. An imaging apparatus comprising the focus detection apparatus configured to perform a focus detection using a first signal and a second signal obtained by photoelectrically converting light passing through different pupil areas in an imaging optical system,
wherein the focus detection apparatus includes:
a calculator configured to calculate an image shift amount between the first signal and the second signal;
a focus detector configured to calculate a first defocus amount from the image shift amount and a conversion coefficient; and
a corrector configured to calculate a second defocus amount by correcting the first defocus amount, which is calculated by the focus detector, using a correction coefficient based on a phase transfer function corresponding to the different pupil areas,
wherein the correction coefficient is used for converting the first defocus amount into the second defocus amount.

11. A focus detection method configured to perform a focus detection using a first signal and a second signal obtained by photoelectrically converting light passing through different pupil areas in an imaging optical system, the focus detection method comprising:
a calculation step configured to calculate an image shift amount between the first signal and the second signal;
a focus detection step configured to calculate a first defocus amount from the image shift amount and a conversion coefficient; and
a correction step configured to calculate a second defocus amount by correcting the first defocus amount, which is calculated in the focus detection step, using a correction coefficient based on a phase transfer function corresponding to the different pupil areas,
wherein the correction coefficient is used for converting the first defocus amount into the second defocus amount.

12. The focus detection method according to claim 11, wherein the correction coefficient is set to be small when an absolute value of the first defocus amount is large and to be large when the absolute value is small.

13. A non-transitory computer-readable storage medium storing a program that causes a computer in a focus detection apparatus to execute a focus detection method configured to perform a focus detection using a first signal and a second signal obtained by photoelectrically converting light passing through different pupil areas in an imaging optical system,
wherein the focus detection method includes:
a calculation step configured to calculate an image shift amount between the first signal and the second signal;
a focus detection step configured to calculate a first defocus amount from the image shift amount and a conversion coefficient; and
a correction step configured to calculate a second defocus amount by correcting the first defocus amount, which is calculated in the focus detection step, using a correction coefficient based on a phase transfer function corresponding to the different pupil areas,
wherein the correction coefficient is used for converting the first defocus amount into the second defocus amount.

* * * * *